United States Patent [19]

Besik

[11] 4,104,167
[45] Aug. 1, 1978

[54] APPARATUS FOR PURIFYING WASTE WATERS

[76] Inventor: Ferdinand Besik, 3243 Chokecherry Cres., Mississauga, Ontario, Canada, L5L 1B1

[21] Appl. No.: 765,886

[22] Filed: Feb. 7, 1977

Related U.S. Application Data

[62] Division of Ser. No. 730,815, Oct. 8, 1976.

[51] Int. Cl.² .............................................. C02C 1/08
[52] U.S. Cl. ................... 210/195 S; 210/197; 210/202; 210/220; 210/257 R
[58] Field of Search ................. 210/7, 14, 15, 20, 170, 210/195 S, 197, 202, 220, 221 R, 257 R, 260, 261

[56] References Cited

U.S. PATENT DOCUMENTS

| | | | |
|---|---|---|---|
| 2,296,437 | 9/1942 | Green | 210/20 |
| 2,370,356 | 2/1945 | Kamp et al. | 210/197 |
| 2,500,774 | 3/1950 | Sebald | 210/20 |
| 2,852,140 | 9/1958 | MacLaven | 210/195 S X |
| 3,053,390 | 9/1962 | Wood | 210/195 S |
| 3,195,727 | 7/1965 | Kibbee | 210/195 S |
| 3,202,285 | 8/1965 | Williams | 210/195 S |
| 3,419,146 | 12/1968 | Koulovatos | 210/195 S X |
| 3,459,659 | 8/1969 | Bedker | 210/261 X |
| 3,618,779 | 11/1971 | Goodman | 210/195 S |
| 3,642,615 | 2/1972 | Wieferig | 210/195 S X |
| 3,709,364 | 1/1973 | Savage | 210/11 X |
| 3,907,672 | 9/1975 | Milne | 210/197 X |
| 3,953,326 | 4/1976 | Reimann | 210/195 S X |

Primary Examiner—Charles N. Hart
Assistant Examiner—Robert H. Spitzer

[57] ABSTRACT

Apparatus in which contaminants from the raw or waste waters are removed by combined biological-chemical degradation of such contaminants comprises first, second and third chambers. An aeration zone is provided in the first chamber. A slanted plate is located in the second chamber to define an aeration zone which overlies a sludge separation zone. Means for transferring such waters from the equalization zone to the upper region of the aeration zone is provided. The slanted plate provides for a downflow of waters through the aeration zone and an upflow of waters through the sludge separation zone, where due to the lower end of the slanted plate being spaced from the lower portion of the second chamber wall forms a constriction to the flow of waters to increase the rate of flow and form a fluidized bed of active media in the sludge separation zone. The height of the sludge separation zone is sufficient to dampen the upward flow of the waters to develop a quiescent region in the upper portion of the sludge separation zone. An upflow channel means is provided in the second chamber with its intake located in the lower region of the sludge separation zone and with its outlet located in the upper region of the aeration zone. Means for dispersing air into the active media which is circulated through the upward flow channel is provided. The third chamber has a clarifying zone. Means is provided for transferring the processed waters from the upper region of the sludge separation zone to the clarifying zone.

7 Claims, 5 Drawing Figures

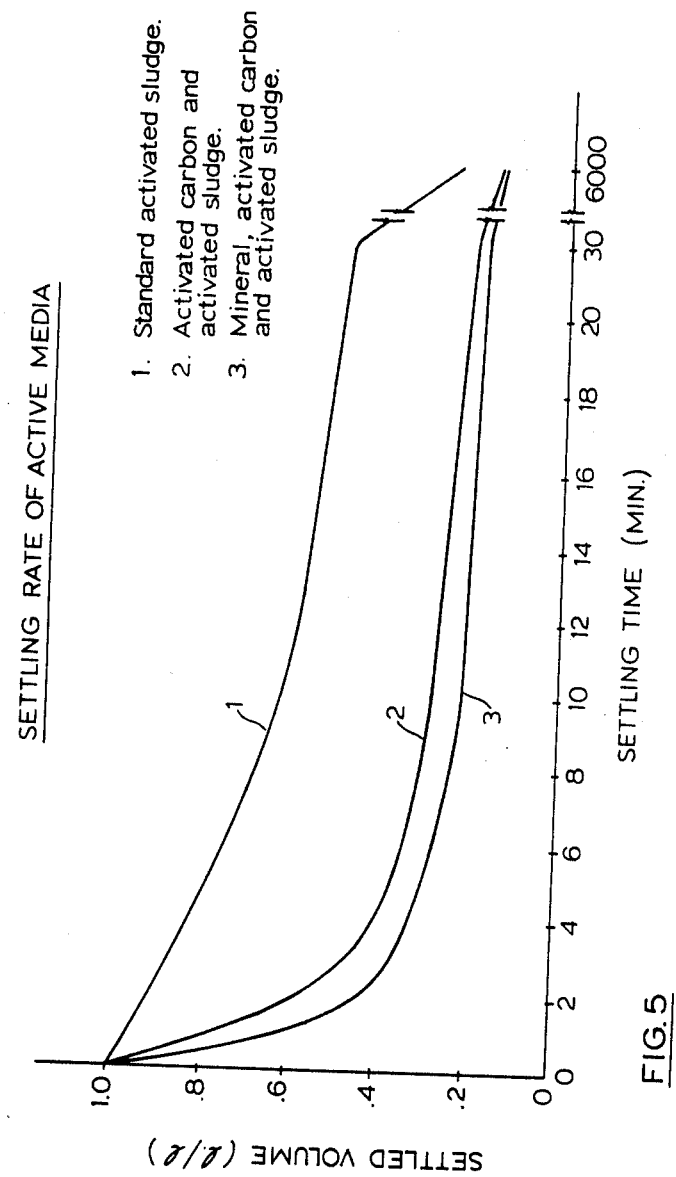

APPARATUS FOR PURIFYING WASTE WATERS

This is a division of application Ser. No. 730,815 filed Oct. 8, 1976.

FIELD OF INVENTION

This invention relates to apparatus in which contaminants are removed from waste waters. The process carried out in the apparatus incorporates the use of finely divided mineral or minerals to form an active sludge to increase the concentration of and to enhance the distribution of active micro-organisms in the reaction system and to assist and enhance the yield of simultaneously occuring biological and chemical reactions.

BACKGROUND OF THE INVENTION

It is important to remove contaminants from raw and/or waste waters before discharge of such waters, because contaminants such as those found in sewage waters, various industrial waste waters, storm sewer waters and the like, have a destructive effect on the environment. Existing processes for removing such contaminants from waste waters entail breaking down the diodegradable contaminants by the action of active micro-organisms and removing other contaminants by physical and/or chemical precipitation techniques. With such processes, several different process steps are usually carried out in separate stages of a treatment system requiring relatively expensive equipment and the use of substantial areas of land. This type of treatment is not readily scaled down for use in treating small volumes of raw or waste waters at a site of limited size.

It is therefore an object of the invention to provide an apparatus for removing contaminants from contaminated waters with a minimum of process steps carried out in the apparatus.

It is another object of the invention to provide an apparatus wherein the waste treatment process removes various organic suspended solids, nitrogen containing compounds, and phsophorous containing compounds from the waste waters by co-acting biological and chemical reactions.

It is yet another object of the invention to provide an apparatus for purifying contaminated waters, which is capable of unattended operation and readily lends itself to use in large municipal waste water treatment systems, apartment size waste water treatment systems, single family dwelling waste water treatment systems, waste treatment systems on boats, ships, recreational vehicles and the like, in shopping centres, airports, recreational areas, such as camps, waste treatment systems in food processing industries, fish hatcheries, pulp and paper industries, coke processing stages of steel mills, paint industry, and in any other type of industry, domestic area or raw water purification wherein partially or wholly biodegradable contaminants and non-biodegradable contaminants are to be removed.

It is a further object of the invention to provide an apparatus for purifying waste water where compared to existing systems the waste water may be processed in a more efficient manner to thereby reduce the physical size of the treatment system.

It is yet a further object of the invention to provide a waste treatment apparatus whereby waste waters are efficiently contacted with highly concentrated activated sludge containing the mixed active microbial population for digesting the contaminants.

A further object of the invention is to provide waste treatment system apparatus which is readily adapted to miniaturization for use in locations of limited size; such as single family dwellings, boats, recreational vehicles and the like.

SUMMARY OF THE INVENTION

These objects, advantages and features of the invention are attained by contacting contaminated waters with active media which includes, among other things, active micro-organisms in activated sludge, and one or more powdered or finely divided minerals. The presence of mineral in the active media enhances the concentration and distribution of the active micro-organisms within the reaction system and assists in efficient microbial degradation of biodegradable contaminants and in the precipitation of ionic species present in the processed waste water. The selected powdered mineral or minerals should be essentially insoluble in the waste waters and non-toxic to the active micro-organisms.

Although the powdered mineral or minerals used have limited solubility or are essentially insoluble in the processed waste water they will, however, dissociate to a certain degree to release metal ions. The released metal ions assist in the control of the pH of the processed waste water and also combine with other ion species in the waste water, such as phosphates, to form insoluble precipitates and thereby assist in the removal of phosphates from the waste water. Due to the essentially insoluble nature of the minerals used in the process, replenishing of the minerals is kept to a minimum.

To improve the clarity of the effluent, powdered or granular activated carbon may be added to the active media. In addition, various treatment chemicals, such as alum and flocculating agents, may be added to improve the quality of the effluent according to standard sewage treatment techniques.

The use of one or more powdered minerals in waste treatment systems particularly enhances the efficiency of fluidized bed reaction systems. The minerals combine with or collect on their surfaces and active micro-organisms so that the suspended mineral particles in the fluidized bed enhance the distribution of the micro-organisms in the waste waters as they pass through the fluidized bed. Due to their relatively high density, the minerals assist in maintaining a high concentration of the mixed microbial population in the fluidized bed and also permit the treatment of higher flow rates of waste waters than could be treated by prior processes.

The concentration of the powdered mineral in a fluidized bed may vary considerably, depending upon the density of the selected mineral and the flow rates of waste waters through the fluidized bed. The concentration of mineral should be sufficient to increase the density of the activated sludge by the combination of mineral therewith so that there is an effective net increase in the concentration of active micro-organisms within the fluidized bed. The mineral is usually finely divided and is of a particle size of 50 mesh or less United States Standard Screens.

Various types of waste treatment system apparatus may be used; for example, the standard activated sludge waste treatment system may have powdered mineral introduced into the processed waste waters to attain the advantages of this invention. Usually waste treatment system apparatus includes communicating chambers basically comprising an aeration chamber, a sludge separation chamber and a clarifying chamber.

According to an aspect of the process of this invention, a fluidized bed is provided in a waste treatment system apparatus in order to attain the above noted features of the invention. Such a fluidized bed may be provided at various stages in processing apparatus, such as in a sludge separation chamber or in a clarifying chamber.

In order to promote the various biological processes which take place in the microbiological degradation of the contaminants, differing concentrations of dissolved oxygen should be maintained in the treatment system to ensure the bio-oxidation of suspended organics, the nitrification of ammonia compounds and respiratory denitrification of nitrites and nitrites. Further, the mixing in the fluidized bed should promote the precipitation of phosphorous containing compounds by metal ions dissociated from the minerals, to promote the flocculating or coagulating of the suspended solids and to maintain a pH of the liquid favourable to the formation of phosphates ions and the like.

The apparatus, according to this invention for treating waste waters, may be made on a sufficiently small enough scale for installation in single family dwellings or on a large enough scale to handle waste waters from municipalities, industries and other large concerns. The apparatus may include an enclosure wherein a slanted plate is located for defining and separating an aeration chamber from a sludge separation chamber. The slanted plate defines in the chamber, two triangular shaped sections where the narrowest portion of the aeration chamber is beneath the narrowest portion of the sludge separation chamber resulting in the aeration chamber overlying the sludge separation chamber. According to an aspect of the invention, an aeration upflow channel has its intake located across the lower region of the sludge separation chamber or zone and its outlet located across the upper region of the aeration chamber or zone. Means is provided for circulating the active media up the aeration channel and for dispensing oxygen into such active media. The slanted plate slopes upwardly towards the aeration channel. The lower end of the slanted baffle plate may be located in a manner to form a constriction to the flow of waste waters from the aeration chamber into the sludge separation chamber so that the velocity of the waters is increased as it enters the sludge separation chamber. The upward flow of the waste waters forms a fluidized bed of active media in the sludge separation chamber. Accordingly, the height of the sludge separation chamber should be sufficient to dampen the upward flow of the waters therein so that a quiescent region is developed in the upper portion of the sludge separation chamber to effectively separate a major portion of activated sludge from the processed contaminated waters.

The hydraulics of the clarifying chamber may be designed to provide a fluidized bed area therein to attain the advantages and features of this invention. This may be accomplished by various arrangements of downflow and upflow channels. Baffles separate the downflow and upflow channels where a fluidized bed may be formed in the upflow channel parts. Baffles may also be used to separate the upflow channels from sludge settling chambers where the height of the baffles separating the sludge separation chambers from the upflow channels is such to insure a sufficient volume for accommodating the fluidized bed of active media for a particular flow rate of processed waste waters therethrough.

DESCRIPTION OF THE DRAWINGS

The aforementioned and other objects, advantages and features of the invention will become apparent in the following detailed description of the preferred embodiments, as shown in the drawings wherein:

FIG. 5 is a graph showing the settling rates of various forms of active media.

DETAILED DESCRIPTION OF THE PREFERRED EMBODIMENTS OF THE INVENTION

It is not fully understood how the powdered mineral combines with the active micro-organism and affects the simultaneously occuring biological-chemical reactions, however, it is theorized that the powdered minerals provide surfaces on which active micro-organisms locate to thereby increase the density of the formed active sludge and the activity of the solid surfaces assist in some way in the chemical reaction. This expedites separation of the sludge from the waste waters and enhances the distribution of the micro-organisms in the active sludge as waste waters flow therethrough and the yield from the simultaneously occuring chemical and biological reactions. As the population of the micro-organisms increases, the mineral serves to retain the micro-organisms in the sludge and this helps to maintain a high concentration of micro-organisms in the reaction system. There are several types of minerals which may be used providing they are non-toxic to the micro-organisms, finely divided and are essentially insoluble in the waste waters. Examples of minerals which may be used in the process are: Calcite, Cerussite, Clinoptilolite, Corundum, Diaspore, Gibbsite, Halloysite, Hematite, Kyanite, Millerite, mixtures thereof and the like.

Most of these minerals are insoluble, or essentially insoluble in water, for example Gibbsite and Hematite are essentially insoluble whereas Calcite and Corundum have a slight degree of solubility in water. It is understood, of course, that even the minerals which are essentially insoluble in water tend to dissociate and release metal ions into the processed waste water. These released metal ions may combine with phosphates and other ionic species in the waste water to form insoluble precipitates. The released metal ions also assist in the control of the pH of the system where the desired range is between 6 to 8.

The powdered minerals are preferably ground so that they pass through United States Standard Screen Mesh Size 50 and up to 300 or more. The more finely the mineral is divided, the larger the surface area on which the micro-organisms and suspended solids may locate.

The waste waters when treated according to the processes of this invention are contacted with a mixture of active micro-organism, one or more powdered minerals, precipitates, and other additives. This combination is referred to, as hereinbefore, as the active media.

Figure 1:
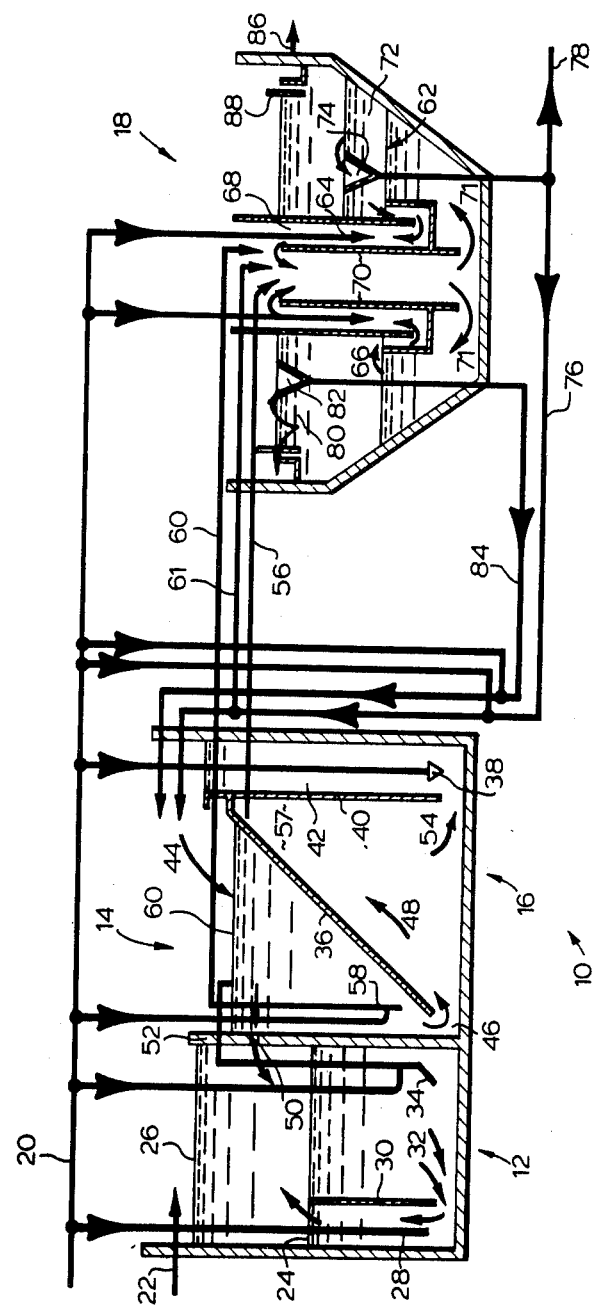
FIG. 1 is a schematic view of apparatus which may be used in carrying out the process according to this invention.

With the attendant advantages of the process of this invention, sewage treatment systems may be developed in various sizes ranging from that which may be installed in the basement of a single family dwelling to sizes which are capable of handling municipal waste waters, industrial waster waters and other sources of large volume of waste or raw waters. The process according to this invention may be readily used in the existing sewage treatment systems, such as the activated sludge process which treats both municipal and industrial waste. According to a preferred embodiment of the invention, FIG. 1 shows a schematic of a reactor system in which an aspect of the process according to this invention may be carried out.

The reactor system 10 comprises an equalization chamber 12 in a first tank, an aeration chamber 14, and a sludge separation chamber 16 in a second tank and a clarifying chamber 18 in a third tank. Air is supplied to the various air pumps in the reactor system 10 by air line 20. Waste waters enter the reactor system 10 by pipe 22 which feeds into the equalization chamber 12. Equalization chamber 12 dampens the effect of wide variations in the flow rate of incoming waste waters on the hydraulics and liquid levels in the remainder of the system.

The level of the waste waters in the equalization chamber 12 may vary from level 24 up to level 26 without substantially affecting the levels in the aeration chamber 14 nor the sludge separation chamber 16. An air diffuser 28 is located between plate 30 and the wall of chamber 12 to promote mixing in the directions of arrows 32. The mixing of the raw incoming waste waters with the material already in the equalization chamber tends to level out extremes in the concentration of various types of contaminants.

The material in the equalization chamber 12 is pumped into the aeration chamber 14 by air pump 34. Depending on the type of air pump used the hydrostatic head can affect the flow rates through the pump. For higher levels of liquid in the equalization chamber the pump may transfer the liquid at a higher flow rate than when the liquid level is lower. The flow rate of the waste liquid through the pump 34 determines the flow rates of waste waters through to the clarifier and, in turn, the flow rate of the effluent because the remainder of the system is balanced hydrostatically. It is understood of course, where a constant flow rate of incoming waste water can be achieved and is at a rate so as not to upset the hydraulics of the remainder of the system, the equalization chamber 12 may be eliminated.

The aeration chamber 14 is essentially isolated from the sludge separation chamber 16 by a slanted partition 36. Air diffusers 38 are positioned behind a partition 40 to draw active media and the processed waste water from the sludge separation chamber and lift it upwardly through aeration channel 42. The aerated waters flow out of channel 42 into the aeration chamber 14 in the direction of arrow 44. The slanted plate 36 isolates the waters from the sludge separation chamber 16 so that such waters flow downwardly towards the throat 46 at the base of the aeration chamber 14. Due to the air diffusers 38 drawing liquid from the bottom of the tank under the sludge separation chamber or zone 16, the velocity of the liquid increases as it passes through the throat 46 because it acts as a constriction to the flow. A portion of the liquid flows upwardly in the direction arrows 48 to create a fluidized bed in this area of the sludge separation chamber 16. In addition, the upward flow of the liquid lifts active media settling at the base of the sludge separation chamber up into the fluidized bed area to maintain a high concentration of active micro-organisms in the fluidized bed of active media. The active micro-organisms in the active media is therefore fluidized in this area for a particular flow rate of the waste waters as determined by the rate at which the air diffusers 38 pump the liquid up through channel 42 and as influenced by the rate at which pump 34 transfers liquid from equalization chamber 12 into the aeration chamber 14.

A minor portion of the aerated waste waters as it leaves channel 42 flows across the top of reactor chamber 14 and empties back into the equalization chamber 12 through the opening 50 provided in the partition 52 of the reactor system. In this manner the active media including micro-organisms is introduced into the equalization chamber for purposes of beginning the biological and chemical degradation of contaminants in the waste waters and also to offset variations in concentrations of contaminants in the incoming waste waters.

The concentration levels of dissolved oxygen in the aeration chamber 14 and the sludge separation chamber 16 vary a substantial amount to provide an aerobic environment in which the mixed population of micro-organisms oxidize the organics and nitrify the ammonia compounds to form metal nitrates and nitrites and to provide an essentially anoxic environment in the same system whereby the mixed microbial population denitrify the nitrates and nitrites to form free nitrogen. The dissolved oxygen levels in the upper portion of aeration chamber 14 are the highest due to passage of waste waters through aeration chamber 42. The oxygen levels are usually in the range of 1 mg./l up to 2 mg./l As the waste waters and active media flow downwardly in the reactor chamber 14 the level of dissolved oxygen decreases due to the take-up of oxygen in the biological oxidation of degradable organics and the nitrification of the ammonia compounds. The dissolved oxygen is at a lower level in the throat area 46 of the reactor and may be less than 0.5 mg./l. The environment in the chamber 16, therefore, approaches anoxic conditions and as a result the mixed microbial population begins respiratory denitrification of the nitrates and nitrites to remove oxygen molecules therefrom and release free nitrogen from the system. The denitrification of nitrates and nitrites is continued in the fluidized bed area of arrow 48. A portion of the active media in the fluidized bed area is extracted as shown by arrow 54 and returned to the aeration channel 42. Above the fluidized bed area 48 the active micro-organisms precipitates and other solids separate from the processed waste liquid in the quiescent zone 57. The processed waste waters flow into the clarifier 18 via conduit 56.

The concentration of the micro-organisms in the active media can become high, particularly in the fluidized bed area of the sludge separation chamber due to the inherent efficiencies of a fluidized bed. It has been found that the concentration of active media in the mixed liquor is in excess of 20 gm./l. Due to the characteristics of the fluidized bed the active media do not flow out through conduit 56 to clarifier 18 unless there is an excess caused by growth in the microbial population.

Biochemical reactions are carried out also in clarifier 18. To ensure that active micro-organisms are in the clarifier without relying on excess being transferred by conduit 56, air pump 58 is provided to pump active media which contain micro-organisms into clarifier 18 through conduit 60. Chemicals such as alum and flocculting agents may be introduced into the clarifier in accordance with standard sewage treatment procedures.

The clarifier serves to separate the suspended solids from the waste waters and to further reduce the level of contaminants in such waters to provide a clear odourless effluent with concentration of phosphates, nitrates, nitrites, ammonia and BOD which is safe for the environment.

The clarifier 18 has a fluidized bed formed in the general area 62 by the arrangement of the hydraulics shown in the drawings in the directions of the arrows. Air pumps 64 withdraw liquid from the fluidized bed area in the direction of arrows 66 and lift the liquid upwardly in annular channel 68. The material flows over into and downwardly in channel 70 as it is combined with effluent coming from the sludge separation chamber 16. The quantity of dissolved oxygen in the processed waste waters in the channel 70 of the clarifier is usually below 1.0 mg./l, so that in essence the mixed microbial population finds itself in an anoxic environment. The respiratory denitrification of the nitrites and nitrates is continued. As the material exists from channel 70 it flows upwardly in the direction of arrows 71. Due to the configuration of the chamber 18 with the outwardly sloping sidewalls, the flow rate of the liquid is highest at the bottom and decreases as it flows upwardly to effectively form a fluidized bed of active media in the area 62. Above the active media a layer 72 of light particles or sludge is formed from which a portion of solids is extracted by skimmer 74 and either returned to the aeration chamber 14 by conduit 76 or a portion thereof discarded by conduit 78.

Flocculating agents and coagulants may be added to complete the removal of phosphates and other undesirable suspended solids in accordance with standard sewage treatment techniques to provide clarified waste water in the upper portion 80 of the clarifier. Any solids floating on the top of the waters are removed by skimmer 82 and returned to the aeration chamber 14 by conduit 84. The effluent leaves the clarifier by conduit 86 where floating solids are separated from the effluent by trap 88.

The powdered mineral or minerals may be added to the aeration chamber or the clarifier. The minerals are then circulated amongst the remaining chambers via the hydraulics of the system. A major portion of the mineral circulates in the clarifying chamber due to its greater size. As discussed, in the fluidized bed area 62, the top layers 72 thereof contain predominantly the biological solids mixed with the precipitates and some minerals. The lower portion of the fluidized bed contains the major portion of the powdered minerals. Thus, the excess sludge which is removed by skimmer 72 is mostly non-degradable solids, excess biological solids, the formed precipitates and some minerals which are recirculated. The oxygen required to continue this biooxidation of remaining organic matter and ammonia in the fluidized bed 62 is introduced by air diffusers 64. A small amount of active media is recirculated to the clarifier via lines 60 and 61 to supplement the active microorganisms in the clarifier. During the cold weather, the activity of the micro-organisms in the fluidized bed of the clarifier can be increased by adding methanol or some other acceptable source of carbon to satisfy the diet of the micro-organisms.

Figure 2:
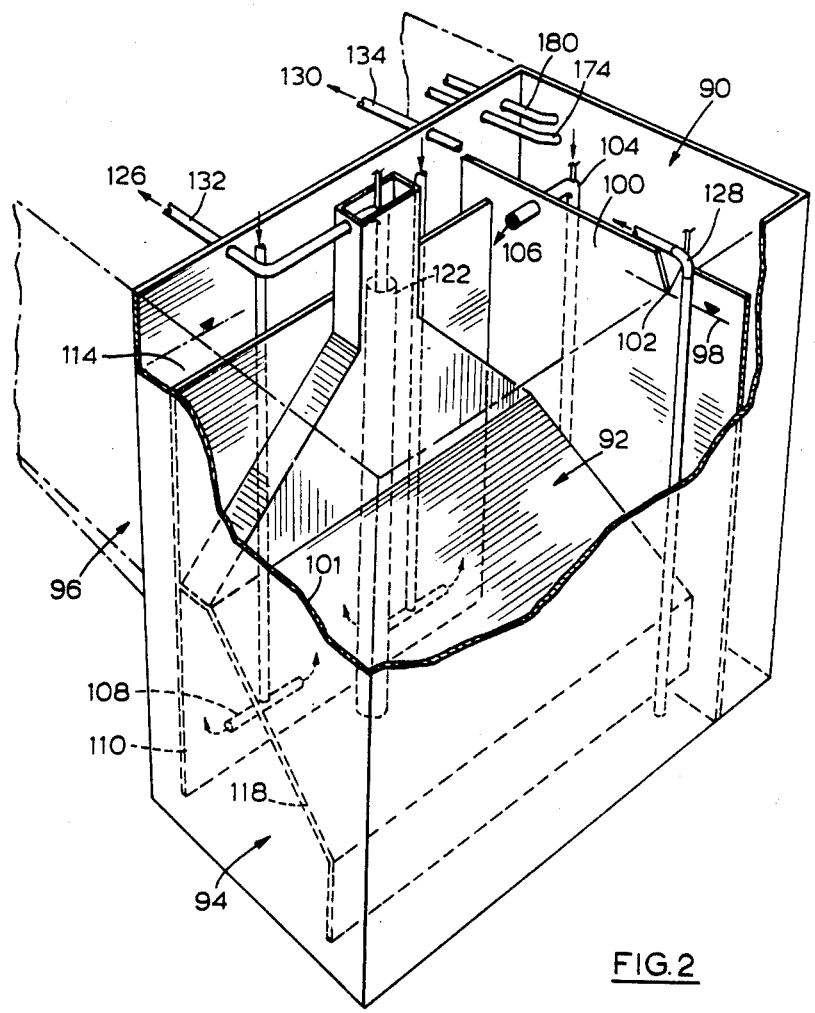
FIG. 2 is a partially cut away perspective view of the equalization and aeration chamber according to a preferred embodiment of the invention for use in treating waste waters.

As can be appreciated, the waste waters as contacted with the active media, are treated in various chambers of the treatment system to provide a clarified effluent which after disinfection by ozone treatment or the like, is safe for discharge into the environment. The treatment system provides by selected hydraulics a fluidized bed which enhances the removal of contaminants from waste waters in an efficient manner. Such a system can be considerably miniaturized for use in limited quarters such as in the treatment of domestic sewage in apartment buildings, townhouse developments, single family dwellings or the like. It is understood, however, that the system can also be substantially enlarged to handle very high volumes of municipal waste liquids. FIGS. 2 through to 4 show a preferred embodiment of the inventive apparatus for the treatment of domestic sewage.

FIG. 2 shows the equalization chamber 90, the aeration chamber 92, and the sludge separation chamber 94. The clarifying chamber is located at the back as shown in shadow at 96. This system is therefore analogous to and functions in the same manner as the system schematically shown in FIG. 1. Raw sewage waters are fed into the equalization chamber 90 where the level in the equalization chamber may go as high as level line 98. The equalization chamber 90 is separated from the aeration chamber 94 by partition 100. The processed waste waters in the aeration chamber 92 are returned to the equalization chamber 90 via the V-shaped opening 102 provided in the partition 100. The mixture of active media and raw sewage waters in the equalization chamber is lifted into the aeration chamber 92 by air pump 104 and discharged in the direction of arrow 106.

The rate at which air pump 104 pumps the waste waters into the aeration chamber 92 varies depending on the height of hydrostatic head of the waste liquid in the equalization chamber. If there is a large influx of waste waters to raise the level in the chamber 90, the air pump 104 pumps at an increased rate. The flow rate in the aeration chamber and the remaining chambers depends upon the flow rate of waste waters through the air pump 104. The equalization chamber 90 therefore dampens extremes in flow rates of incoming raw sewage.

The active media is circulated through aeration chamber 92 and sludge separation chamber 94 by way of air diffusers 108 which are placed behind a partition 110. An intake 112 is provided at the base of the reactor as more clearly shown in FIG. 4. An aeration channel 114 is defined between the partition 110 and the backwall 116 of the aeration chamber. Waste waters and active media are lifted up through channel 114 by air diffusers 108 and spilt over the top of partition 110 into the aertion chamber 92. The waste waters and active media move downwardly in aeration chamber 92 and are caused to flow to the front of the chamber in direction of arrow 117 by slanted baffle plate 118. The baffle extends all the way across chamber 92 to its sidewalls 100 and 101 to isolate chamber 92 from chamber 94. The waste waters travel into the sludge separation chamber 94 through gap 120 at the base of baffle 118. The gap 120 constitutes a constriction to the flow of liquid so that the liquid velocity is increased as a portion of the liquid rises in direction of arrow 121 to thereby create a fluidized bed in sludge separation chamber 94. The mineral present in the active media assists in retaining the active micro-organisms in the fluidized bed so that in the upper portion of chamber 94, skimmer 122 takes off the processed waste waters and transfers them by air pump 124 through the conduit 132 in the direction of the arrow 126. A small portion of active media may be continuously circulated from the aeration chamber 92 to the clarifier 96 by way of air pump 128 through conduit 134 in the direction of arrow 130.

Figure 3:
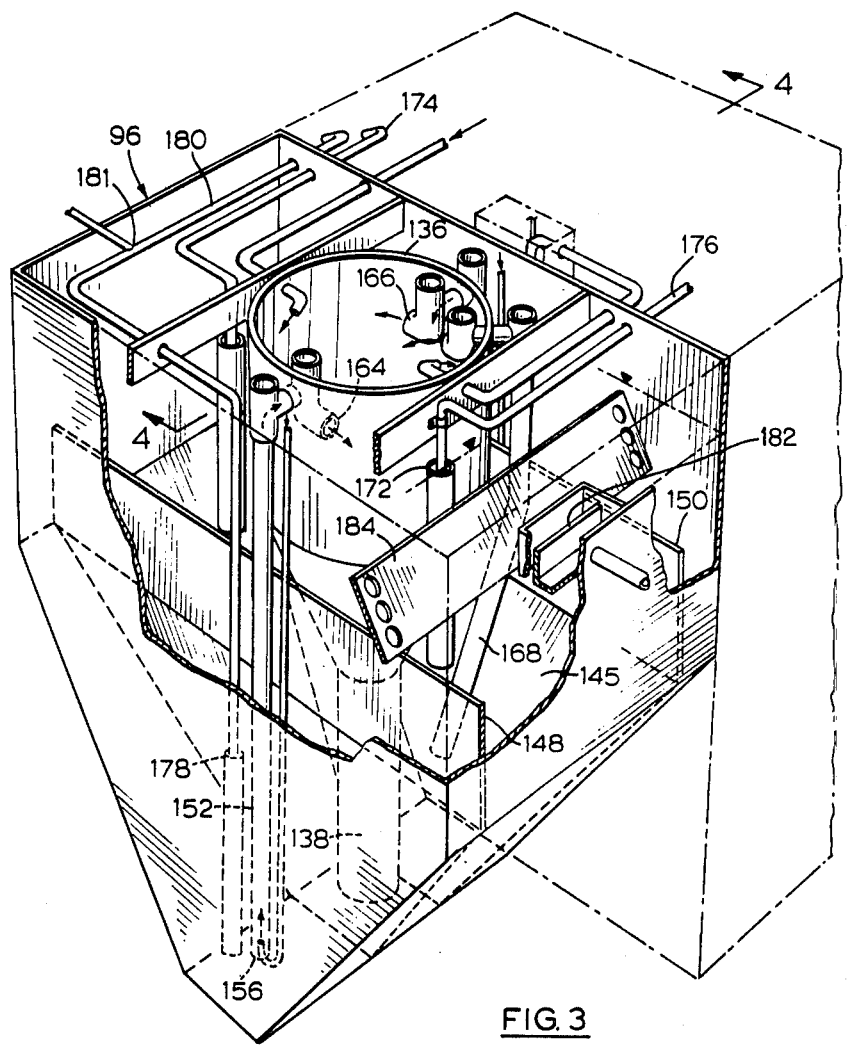
FIG. 3 is a cut away perspective view of the clarifying chamber of the apparatus, which is in communication with the reactor chamber shown in FIG. 2 of the drawings.
Figure 4:
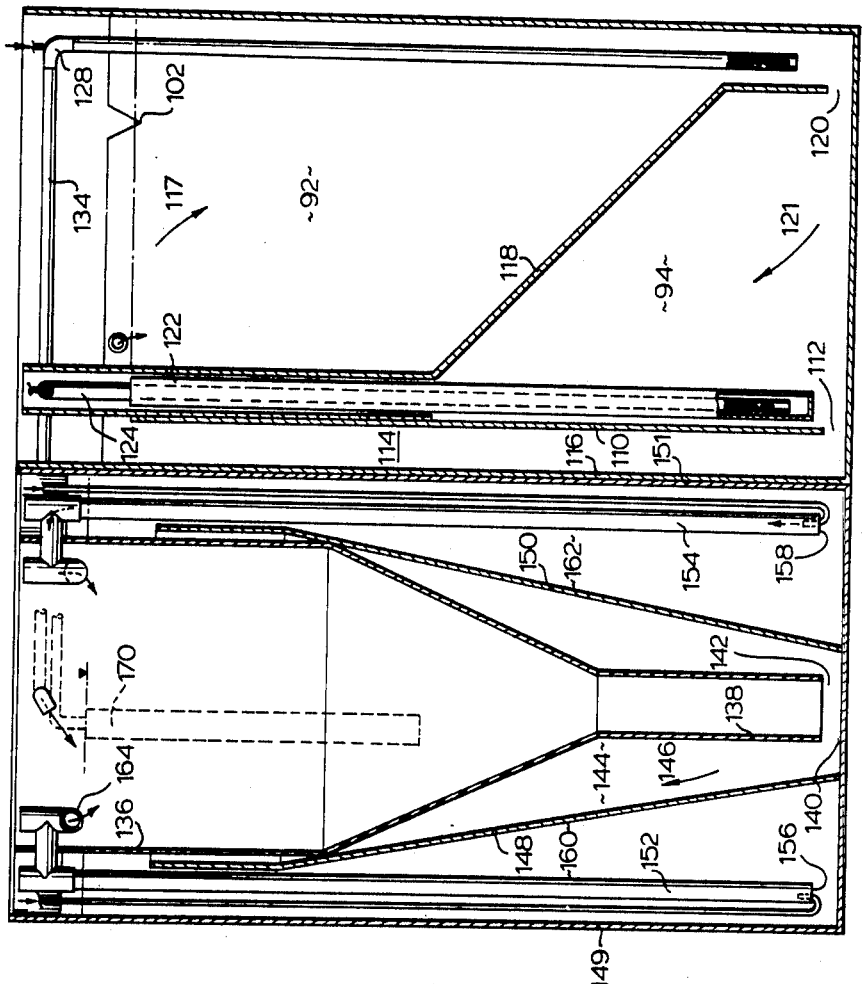
FIG. 4 is a section taken along the line 4—4 of FIG. 3.

Turning to FIG. 3, the active media and processed waste water enter the clarifier chamber 96 via a funnel-shaped downflow channel 136. The base 138 of the funnel-shaped channel is above the bottom 140 of the clarifier to define a gap 142 as shown in FIG. 4. From this point the material flows upwardly in the direction of arrow 146 to create a fluidized bed of active media in the area 144. Slanted plates 148 and 150 define a chamber 145 around funnel-shaped channel 136. The plates 148 and 150 extend upward a sufficient distance to provide a volume of adequate size to ensure the formation and maintenance of a fluidized bed in chamber 145. Air lifts 152 and 154 are located between plates 148 and 150 and the respective outside walls 149 and 151 of the clarifier. The air lifts have intakes at 156 and 158 to withdraw material from the base of the sludge settling chambers 160 and 162 and lift the material upwardly and direct it into the funnel-shaped chamber 136. The location of intakes 156 and 158 assist in the settling of sludge in chamber 160 and 162. The openings 164 and 166 are directed in a manner so as to cause the material in the funnel-shaped channel 136 to form a vortex in the funnel-shaped chamber to assist in the mixing of the material. The air lifts 152 and 154 add some oxygen to the active media so that the biological oxidation of contaminants may continue as the active media and waste water descends in chamber 136.

Active media and waste water from the fluidized bed 144 are lifted directly from the fluidized bed by air lift 168 and dumped into chamber 136 so as to ensure a level of active media in the downflow portion of funnel-shaped chamber 136.

Floatable solids are skimmed off the surface by skimmers 170 and 172 and returned to the aeration chamber and to the equalization chamber by conduit 174 and 1976. A portion of settled sludge is extracted from sludge settling chamber 160 by air lift 178 and returned to the equalization chamber by pipe 180. Some of the returned sludge may be discarded through T-junction 181 in pipe 180.

The clarified effluent which is above the fluidized bed area 146 and the sludge settling chamber 148 is removed from the clarifier by separator 182. A baffle plate 184 is located beneath the separator 182 to deflect the upflowing lighter suspended solids of the fluidized bed away from the separator 182.

The selected mineral or minerals may be added to the clarifier where, due to the recycling of active media between the clarifier and the aeration chamber, the system equalizes with a major portion of mineral circulating in the clarifier and the minor portion circulating in the aeration and sludge separation chambers.

The effluent from separator 182 may be collected in a sump and periodically pumped from the sump for discharge. As previously discussed, flocculating agents and chemicals which cause precipitation of ion species in the waste waters may be added to the clarifying chamber. The addition of these treatment materials may be by metering pump where the quantity added is based on the quantity of effluent. It follows that with the use of a sump for collecting effluent, each time the sump pump is activated to discharge a predetermined quantity of effluent, the metering pump can be activated to dispense the desired quantities of treatment chemicals.

As is appreciated by those skilled in the art, several different types of flocculating agents may be used in accordance with standard sewage treatment techniques. Particularly useful agents are the cationic polyelectrolyte type such as "CATFLOC" (trademark) sold by Calgon Corporation.

FIG. 5 illustrates the effect the addition of a mineral has on the settling rate of the active media. Curve 1 shows the settling time for standard activated sludge; Curve 2 shows the settling time for the combination of standard activated sludge with activated carbon; and Curve 3 shows the settling time for the combination of mineral, activated carbon and active micro-organisms. Curve 3 is substantially below Curve 1. It is therefore apparent that the addition of minerals to the active micro-organisms substantially increases the density of the active media so as to assist in the settling of sludge.

EXAMPLE 1

The reactor system shown in FIGS. 2, 3 and 4, was used to treat raw domestic sewage from an apartment building in TORONTO, CANADA. The total volume of sewage processed varied from 100 to 360 Imp. Gallons per day on a batchwise flow basis.

For purposes of comparison, two experimental runs were carried out. Run #1 had the mineral Gibbsite added to the active micro-organisms together with powdered activated carbon, coagulant and alum. Run #2 had all the ingredients of Run #1 plus the addition of methanol to the clarifier. The flocculating agent and alum were added to achieve maximum clarity in the effluent.

The operating parameters of the process are shown in Table 1 and the quantitative results of the tests are shown in Table 2. Average values are noted for samples taken.

TABLE 1

| OPERATING DATA | RUN #1 | RUN #2 |
|---|---|---|
| TOTAL SYSTEM'S VOLUME (Imp.Gal.) | 350 | 350 |
| REACTOR & SLUDGE SEPARATION CHAMBER VOLUME (Imp.Gal.) | 240 | 240 |
| CLARIFYING CHAMBER VOLUME (Imp.Gal.) | 110 | 110 |
| FLOW RATE OF SEWAGE (Imp.Gal./Day) | 100–200 | 100–200 |
| PROCESS AIR (SCFM) | 6 | 6 |
| DISSOLVED OXYGEN: | | |
| Aeration Chamber (mg./l.) | 1.0–2.0 | 1.0–2.0 |
| Clarifier (mg./l.) | 0.0–1.0 | 0.0–1.0 |
| SUSPENDED SOLIDS | | |
| Aeration Chamber (gm./l/) | 100 | 100 |
| ACTIVATE MEDIA | | |
| Mineral - Gibbsite (lb.) | 200 | 200 |
| Activated Carbon (lb.) | 30 | 30 |
| Micro-organisms | Yes | Yes |
| TREATMENT CHEMICALS | | |
| Alum (mg./l. of effluent) | 100 | 100 |
| "CATFLOC" (mg./l. of effluent) | 5 | 5 |
| Methanol (mg./l. of effluent) | — | 300 |

TABLE 2

| WATER QUALITY | RAW SEWAGE | EFFLUENT RUN #1 | % REMOVED | RUN #2 | % REMOVED |
|---|---|---|---|---|---|
| SUSPENDED SOLIDS (mg./l.) | 40-400 | <3.0 | 99 | 3.0 | 99 |
| TOTAL DISSOLVED SOLIDS (mg./l.) | 300-600 | <500 | — | <500 | — |
| TURBITY (NTu) | 80-160 | <0.7 | 99 | <0.5 | 99+ |
| $BOD_5$ (mg./l.) | 200-400 | <2.0 | 99+ | <2.0 | 99+ |
| $NH_3$—N (mg./l.) | 10-30 | <0.1 | 99+ | 1.0 | 96.6 |
| $NO_3$—N (mg./l.) | 0.1-0.2 | 10-15 | — | 1.5 | — |
| $PO_4$—P (mg./l.) | 4-10 | <0.1 | 99 | <0.1 | 99 |
| pH | 7-8 | 7.0-7.5 | | 7.0-7.5 | |

Referring to Table 2, the amounts of ammonia in Run #1 was substantially removed, however, there was still a high level of nitrates in the system. The addition of methanol to the clarifier in Run #2 provided the additional source of carbon needed to satisfy the diet of the micro-organisms to promote the respiratory denitrification of the nitrates and nitrites as evidenced by the substantial reduction in level of nitrates to 1.5 mg./l. The use of mineral in fluidized beds of a sewage treatment system of the type disclosed herein provides for the efficient removal of contaminants from waste liquid as illustrated in Tables 1 and 2.

Although the preferred embodiments of the invention have been discussed herein in detail, it will be understood by those skilled in the art that variations may be made to the inventive process and apparatus without departing from the spirt of the invention or the scope of the appended claims.

I claim:

1. An apparatus for treatment of contaminated waters comprising a first tank in which an equalization zone is defined, a second tank in which aeration and sludge separation zones are defined and a third tank in which a clarifying zone is defined, means for transferring such waters from the equalization zone to the upper region of said aeration zone, a slanted plate located in said second tank with its lower end being spaced from tank bottom and side walls to define said aeration zone which overlies said sludge separation zone; the slanted plate extending across said second tank thereby separating the aeration zone from the sludge separation zone, an aeration upflow channel means being provided in said second tank with its intake across the lower region of said tank and with its outlet across the upper region of said tank, means for circulating such waters and active media up said aeration channel means, out the outlet of said upflow channel means and downwardly through said aeration zone, under the lower end of said slanted plate, along the second tank bottom and through the inlet of said upflow channel means, means for dispensing oxygen into such active media which flows up said aeration channel means, said slanted plate sloping upwardly towards said aeration channel, the lower end of said slanted plate forming a constriction to the circulation of such waters so that the velocity of such waters is increased along the bottom of said second tank below the sludge separation zone, a portion of such waters entering the sludge separation zone and flowing upwardly to develop a fluidized bed of active media, the height of said sludge separation zone being sufficient to effectively separate a major portion of active media from the processed contaminated waters in the fluidized bed, and means for transferring the processed waters from the upper region of said sludge separation zone to said clarifying zone of the third tank.

2. An apparatus of claim 1 wherein said means for dispersing oxygen is located at the base of said upflow channel and comprises an air dispersion tube.

3. An apparatus of claim 1, said third tank comprising a downflow channel, said means transferring processed waters from said sludge separation zone into said downflow channel, a baffle extending upwardly from the base of said tank and adjacent said downflow channel to define an upflow zone, said baffle being spaced-apart from the sidewall of said tank and its upper edge being below the upper liquid level in said upflow zone to define a downflow sludge settling zone and provide for flow from said upflow zone into said downflow zone, a pump means with its intake at the bottom of said downflow sludge settling zone for pumping settled sludge upwardly and into said downflow channel, the pumping of the sludge generating a flow of processed waters through the chamber at a sufficient rate to fluidize the active sludge in the region of said upflow zone, means for withdrawing clarified processed waters from said third tank and means for continuously recycling a portion of the sludge from the clarifier fluidized bed back into said aeration zone of the second tank.

4. An apparatus of claim 3 wherein an inclined baffle plate is located adjacent said means for withdrawing clarified waters.

5. An apparatus of claim 3 wherein a second pump means with its intake located in the upper region of said fluidized region pumps a portion of such processed waters upwardly and into said downflow channel.

6. An apparatus of claim 1 wherein said second tank has opposing side and end walls, said slanted plate being connected to said opposing side walls, an essentially vertical plate connected to said opposing side walls and connected to the upper portion of said slanted plate, said vertical plate extending downwardly and short of the tank bottom and being spaced apart from the adjacent end wall to thereby define said aeration upflow channel means.

7. An apparatus of claim 6 wherein said means for circulating such waters and said means for dispersing oxygen are in combination a plurality of air dispersion tubes loctaed adjacent the bottom of said aeration upflow channel.

* * * * *